May 28, 1935.   T. STENHOUSE   2,003,058
GLASS FEEDER
Filed Oct. 29, 1932
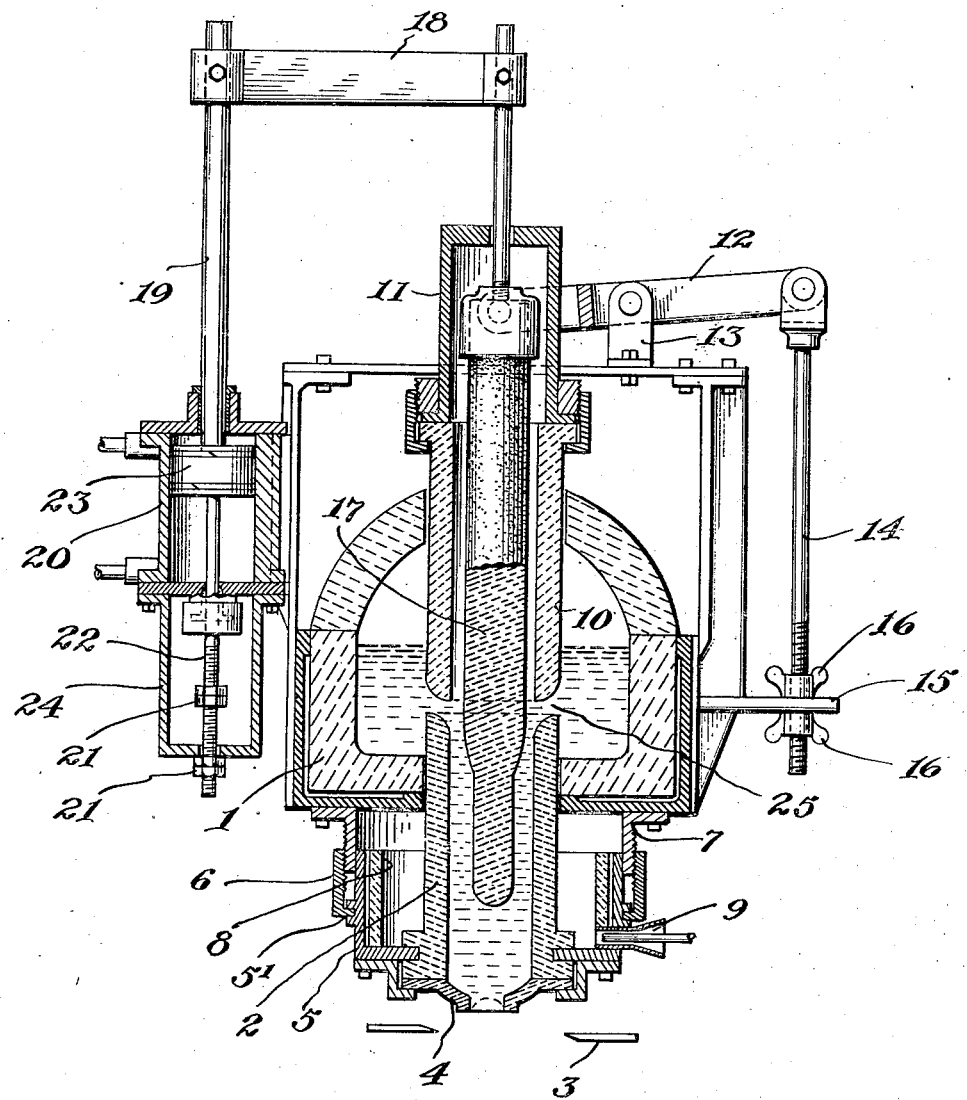

Patented May 28, 1935

2,003,058

UNITED STATES PATENT OFFICE 2,003,058

GLASS FEEDER

Thomas Stenhouse, Washington, Pa., assignor to Hazel-Atlas Glass Co., Wheeling, W. Va., a corporation of West Virginia Application October 29, 1932, Serial No. 640,298

7 Claims. (Cl. 49—55)

It has been the common practice for many years in the glass industry to feed glass through an orifice in the bottom of a flow spout, and to sever the charges as they emerge from the orifice; the severed charges dropping into molds to be formed into glass articles. In some feeders the glass flows through the orifice solely under the influence of gravity; the volume of flow usually being controlled by a stationary plug which is vertically adjustable. In other feeders the flow of glass is alternately accelerated and retarded by the reciprocation of a plunger. In still other feeders the flow of glass is alternately accelerated and retarded by alternately increasing and decreasing the air pressure on the surface of the glass in the flow spout. The present invention relates to all of these feeders, and, in fact, to any kind of glass feeder in which the glass passes through a submerged orifice prior to being severed into charges and dropped into the forming molds.

It is well known that in the manufacture of glass articles the characteristics of the molten glass, such as temperature and fluidity, which are suitable for one article may not be suitable for a different article. In other words, the best results are produced when it is possible to provide molten glass of the proper temperature and fluidity best suited for the particular article being manufactured. Consequently, where articles of many types and many sizes are manufactured, it becomes important to be able to deliver the glass charges of the temperature and fluidity best suited for the particular article being manufactured at the moment. In feeders heretofore known the only control of the temperature of the glass was by the regulation of the burners. Obviously, such control is slow, because time is required to raise or lower the temperature of the glass. Also, such a regulation of temperature is not very accurate, for when the burners are adjusted the temperature of the glass may rise too high or fall too low, and the burners must again be adjusted. All of this results in loss of production.

The molten glass in the flow spout varies in temperature and fluidity from the top to the bottom, the hotter and more fluid glass being at the top, and there being a gradual decrease in temperature and fluidity toward the bottom. One of the objects of the present invention is to provide a construction which makes it possible to draw the glass, which is to be formed into mold charges, from any desired level or selected zone, and blocking off the flow of glass from any other level or zone, whereby the charges delivered to the molds are of the temperature and fluidity best suited to the particular article in course of manufacture.

Another object of the present invention is to provide means whereby the flow of glass may be instantly shifted from one zone to another selected zone.

A further object of the invention is to provide means for controlling and regulating the volume flow of glass in the selected zone of flow.

The continuous flow of glass from the refining chamber of the melting tank through the flow spout toward the nose, causes a channel to be formed. This channel, which is filled with the hotter and more rapidly flowing glass, is surrounded at its sides and bottom by a colder and more sluggish glass. The width and depth of the channel naturally varies in accordance with the volume of glass being drawn from the spout; and, of course, it also varies in accordance with the fire conditions, etc.

Unfortunately there is no clear cut division between the hotter glass of the channel and the relatively cold and sluggish glass surrounding the channel. Consequently it frequently happens that some of the colder glass is drawn into the channel of hot glass. When this occurs, particularly if it is near the nose, there is not sufficient time for an equalization of temperatures, and a relatively cold slug of glass works down through the flow orifice. The delivery of such glass, which is commonly known in the industry as "cordy" glass, often results in a serious loss of production. When such a condition arises it is difficult to cure, often requiring the draining of the nose to eliminate the cold glass in the bottom thereof, and in some instances it becomes necessary to substitute a fresh nose block. One of the objects of the present invention is to provide an apparatus which will, in ordinary circumstances, prevent such a condition from arising; but if, in unusual circumstances, the condition does arise, it may be quickly cured by the mere adjustment of the apparatus, in accordance with the present invention, as will appear more clearly hereinafter, the glass is not drawn in a haphazard fashion from all levels or zones of the glass in the flow spout, but from one particular selected level; the flow of glass from all other levels being blocked. In such a construction it is apparent that the danger of relatively cold streams or slugs of glass combining with the hotter glass of the channel is greatly reduced; but if it should occur it is only necessary to adjust the mechanism to another selected zone or level to block off the flow of the cold portions.

Other objects and advantages of the invention will be apparent to those skilled in the art, from the following detailed description in connection with the accompanying drawing, in which:

The figure is a vertical sectional view of the improved feeder; the shears being illustrated diagrammatically.

Referring to the drawing in more detail, numeral 1 indicates the usual flow spout which receives molten glass from a melting tank, not shown. The bottom of the flow spout, adjacent its forward end, is provided with an opening in which is arranged a bushing 2 of refractory material. The molten glass flows from the flow spout downwardly through the bushing, and the charges are severed by ordinary vertically adjustable shears 3. Of course the shears are timed to operate at the desired instant and with the desired frequency, but as various timing mechanisms are old and well known in the glass art illustration thereof is unnecessary. A removable orifice ring 4, of the desired size, is preferably provided at the lower end of the bushing 2.

In accordance with the present invention the bushing 2 is vertically adjustable. Of course the invention is not limited to any particular mechanism for effecting the vertical adjustment, as various means for this purpose will be at once apparent to the mechanic. The specific adjusting mechanism shown herein, which is merely for the purpose of illustrating the preferred construction, comprises a circular casing 5, which carries the bushing 2. An adjusting ring 6, having its lower end fitted into a groove 5' of the casing, is threaded on a fixed ring 7 attached to the bottom of the flow spout. Thus by the mere rotation of the adjusting ring 6 in the proper direction, the bushing 2 will be raised or lowered to the desired extent. The casing 5 is preferably provided with a refractory lining 8 to reduce loss of heat, and a burner 9 is also usually provided for the purpose of maintaining the proper temperature conditions around the bushing 2.

Numeral 10 refers to a tube of refractory material, which projects downwardly through the top of the flow spout into the molten glass; the tube being in substantial alignment with the bushing 2. In accordance with the present invention the tube 10 is vertically adjustable and obviously any desired mechanism may be employed for mounting the tube and for vertically adjusting it. In the particular apparatus illustrated, the tube is removably clamped to a metallic head 11 which is suspended, by hinge pins or the like, from the inner end of the forked lever 12. This lever is fulcrumed on a bracket 13, and pivoted to and depending from the outer end of the lever is a link or adjusting rod 14. The lower end of this adjusting rod is threaded and passes loosely through an opening in a bracket 15. Nuts 16 are threaded on the rod above and below the bracket, and by means of these nuts the tube 10 is raised or lowered to the desired extent, and maintained in its adjusted position.

For carrying out the present invention it is not necessary that a plug, plunger, or any other controlling mechanism be provided within the tube 10 and/or the bushing 2; but as the feeder more commonly employed at the present time is of the reciprocating plunger type, there is shown an ordinary plunger 17 arranged within the tube and bushing. The plunger is carried by an arm 18 secured to the piston rod 19 of a cylinder 20. Air under pressure is alternately admitted to opposite ends of the cylinder to reciprocate the piston, and of course the admission of air pressure is timed by any of several well known timing mechanisms. The upper and lower limits of the plunger stroke may be adjusted by means of nuts 21 on a rod 22 carried by the piston 23 and projecting downwardly through the lower end of the cylinder. This rod extends loosely through an opening provided in a stirrup 24, and the nuts are threaded on the rod above and below the opening. These nuts 21 are also useful for maintaining the plunger stationary in any desired position when the feeder is to be operated with a stationary plug instead of with a reciprocating plunger.

The operation of the reciprocating plunger, and the manner in which it alternately accelerates and retards the flow of glass, are so well known that a description thereof is unnecessary.

In place of the reciprocating plunger for alternately increasing and decreasing the pressure on the glass, a pneumatic type of feeder may be employed, in which case the pressure of the air within the tube 10 is alternately increased and decreased by any of the mechanisms well known in the glass art.

Also, in place of the reciprocating plunger feeder or the pneumatic feeder, the well known stationary plug may be employed to control the flow of glass. As mentioned above, the reciprocating plunger may be converted into a stationary plug merely by the adjustment of the nuts 21 which will maintain the plug stationary in any desired vertical position. But the present invention does not necessarily require a reciprocating plunger, alternate pneumatic pressures on the glass or even a stationary plug, and consequently the operation of the invention will be described without any of these, but it is to be understood that the invention also contemplates use with any of the above-mentioned control mechanisms or with any other control mechanisms.

Accordingly, for the purpose of the present description, let it be assumed that the invention is being operated without a stationary plug, a reciprocating plunger, or alternately increasing and decreasing the air pressure on the glass surface; and that the bushing 2 and tube 10 are in the positions shown in the drawing. The molten glass will flow by gravity through the annular opening 25, and thence downwardly through the bushing. When the proper amount of glass has emerged from the lower end of the bushing to form the article being manufactured, the shears will operate to sever the formed charge, which then drops into a mold. It will be noted that the tube and bushing are so positioned that the glass is being drawn from a zone about midway between the top and bottom of the glass in the flow spout.

Now let it be assumed that the charges being delivered as described above, do not have the proper characteristics to permit the best working of the glass; for instance, the glass may be too hot and too fluid. If such is the case, both the tube and the bushing will be lowered, so that the glass for the charges will now be drawn from a lower stratum, whereby a cooler and less fluid glass is delivered. Conversely, if the glass should be too cool and not sufficiently fluid for the particular articles being manufactured, then the tube and bushing would be elevated, so that the glass flowing through the opening 25 would be drawn from a higher stratum.

In the continued operation of the feeder, there will be a material variation in the temperature of the glass in the flow spout. When this happens, the operator can correct for the change in temperature by the mere raising or lowering of the tube and bushing; and it will be noted that this correction will be instantaneous, instead of the slow and inaccurate correction of temperature by the adjustment of the burners, as has been the practice heretofore.

It is well known, of course, that in the manufacture of different articles a different condition of the glass is necessary. For example, if small articles are being manufactured the glass used is hotter and more fluid than is the case in the manufacture of large articles. In the practical operation of glass feeders, the same feeder may be called upon to feed glass for a wide variety of articles, varying in size from the smallest to the largest. In the operation of the present feeder, if a rather hot and fluid glass is being used, and it becomes necessary, in the manufacture of a widely different article, to use a much cooler glass, the burners can be adjusted to lower the temperature of the glass, to give a glass of the approximate condition desired, and the tube and bushing can be adjusted to give the exact condition desired. But where, in the manufacture of different articles, there is not a very great difference in the requirements concerning the condition of the molten glass, the necessary change can be effected solely by the operation of the tube and bushing. And the same is true in taking care of normal variations which frequently occur in the temperature of the glass in the flow spout; but, of course, if some extreme variation in temperature should occur, an adjustment of the burners would be necessary.

From the foregoing description it will be understood that the present invention provides for drawing off glass from any zone or level of the glass, from the top to the bottom thereof, whereby a glass of exactly the desired working condition can be obtained. It may be, however, that while the glass delivered is in the desired working condition, yet the charges being delivered are not of the correct weight for the article being manufactured. If the charges are found to be too heavy the weight can be corrected very sensitively by adjusting the tube and bushing toward each other; and if the charges are too light these members are adjusted away from each other. So that the present invention not only provides means for drawing the glass from any selected zone or level and blocking the flow of glass from all other zones or levels; but also provides means for accurately controlling the volume flow of glass from the selected zone. If additional volume regulating means is desired, the old and well known stationary plug may be employed, as hereinbefore mentioned; and if, in the manufacture of certain articles, it is desirable to periodically accelerate and retard the flow of glass, a reciprocating plunger can be used or the air pressure above the glass in the tube can be alternately increased and decreased, as also described hereinbefore. Likewise, the present invention may be used with or without a muffle about the bushing, the bushing and tube may vary widely as to both length and diameter in different installations, and obviously any desired mechanism may be employed for moving the tube and bushing to the desired position.

The foregoing description relates largely to the control of temperature and viscosity to insure the delivery of glass in the best working condition for the particular article being manufactured. The present invention involves, however, another very material improvement over previously known feeders of all types. In the operation of feeders, prior to the present invention, the glass delivered would sometimes become "cordy", from which a serious loss of production would result. The usual cause of the "cordy" glass is the combining of cold slugs or streams of glass with the relatively hot glass in the channel, as mentioned hereinbefore. In the use of the feeder disclosed herein, it will be apparent that there is very little danger of "cordy" glass being delivered, for the glass is drawn from a selected and restricted zone or level, so that all of the glass delivered is of substantially a uniform temperature, as distinguished from the practice heretofore in which the glass was drawn at random from all levels or zones, resulting in a collection or conglomeration of glasses of various different temperatures and conditions.

While the present invention greatly reduces the liability of delivering "cordy" glass, yet in unusual circumstances it might occur. In such an event the condition can be quickly cured by the proper adjustment of the tube and bushing to draw glass from a different zone or level, to block off the flow of the relatively cold slugs or stream.

The main cause of "cordy" glass is the intermingling of the hot glass of the central channel with portions of the relatively cold glass surrounding the channel. If a clear cut division could be maintained between the glass of the channel and the surrounding glass, then "cordy" glass would not be delivered. It is, however, impossible to maintain any such clear cut division between the two glasses; but the present invention accomplishes the same result by restricting delivery to glass from the channel, and indeed to any particular zone or level of the glass in the channel, and preventing delivery of the glass surrounding the channel.

What I claim is:

1. A glass feeder including a flow spout containing molten glass, means for discharging glass from the flow spout, means for selectively varying the stratum from which the glass is discharged, and said second-mentioned means being adjustable for varying the volume discharge of glass from the selected stratum.

2. A glass feeder including a flow spout containing molten glass, a submerged member arranged in the bottom of the spout and through which the glass is discharged, a member projecting downwardly into the glass into cooperative relation with the first mentioned member, said members being adjustable to draw glass from any desired stratum and blocking the flow of glass from any other level.

3. A glass feeder including a flow spout containing molten glass, a submerged member arranged in the bottom of the spout and through which the glass is discharged, a member projecting downwardly into the glass into cooperative relation with the first-mentioned member, said members being adjustable to draw glass from any desired stratum, and said members being adjustable toward or away from each other to control the volume flow of glass from the selected level.

4. A glass feeder including a flow spout containing molten glass, a submerged member arranged in the bottom of the spout and through which the glass is discharged, a member projecting downwardly into the glass into cooperative relation with the first-mentioned member, said members being adjustable to draw glass from any desired stratum, said members being adjustable toward or away from each other to control the volume flow of glass from the selected level, and means for periodically accelerating and retarding the flow of glass.

5. A glass feeder including a flow spout receiving glass from a melting furnace, means for discharging the glass from a stratum and blocking the flow of glass from any other level means for vertically adjusting said discharge and blocking means, and shears for severing the discharged glass.

6. A glass feeder including a flow spout receiving glass from a melting furnace, means for discharging glass from the flow spout, and means for regulating the temperature and fluidity of the glass discharged by selecting the stratum from which the glass is discharged and blocking the flow from any other level.

7. A glass feeder including a flow spout containing molten glass, means for discharging glass from any selected stratum of the glass in the flow spout and blocking the flow of glass from any other level, and means for periodically accelerating and retarding the discharge.

THOMAS STENHOUSE.